US012683753B2

(12) United States Patent     (10) Patent No.:   US 12,683,753 B2
Liu et al.     (45) Date of Patent:    Jul. 14, 2026

(54) COMMUNICATION APPARATUS, TERMINAL DEVICE, AND COMMUNICATION METHOD

(71) Applicant: HUAWEI TECHNOLOGIES CO., LTD., Shenzhen (CN)

(72) Inventors: Ye Liu, Beijing (CN); Jiansong Gan, Beijing (CN); Peng Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 956 days.

(21) Appl. No.: 17/831,751

(22) Filed: Jun. 3, 2022

(65) Prior Publication Data

US 2022/0303103 A1    Sep. 22, 2022

Related U.S. Application Data

(63) Continuation of application No. PCT/CN2019/123583, filed on Dec. 6, 2019.

(51) Int. Cl.
   *H04L 5/14*      (2006.01)
   *H04B 1/44*      (2006.01)
   *H04B 17/382*    (2015.01)

(52) U.S. Cl.
   CPC ................ *H04L 5/14* (2013.01); *H04B 1/44* (2013.01); *H04B 17/382* (2015.01)

(58) Field of Classification Search
   USPC ....... 370/229, 230, 236, 252, 276, 277, 278, 370/280, 281, 282, 294, 295, 328, 329,
      (Continued)

(56) References Cited

U.S. PATENT DOCUMENTS 8,369,250 B1    2/2013   Khlat
11,064,434 B2 *   7/2021   Lin .................. H04W 52/0225
       (Continued)

FOREIGN PATENT DOCUMENTS

CN     102510297 A    6/2012
CN     102640423 A    8/2012
       (Continued)

OTHER PUBLICATIONS

3GPP, "3GPP TR 36.820 V11.2.0 3GPP Technical Specification Group Radio Access Network LTE for 700 MHz digital dividend (Release 11)", 3GPP Technical Report, Jan. 8, 2013,total 35 pages.
       (Continued)

*Primary Examiner* — Nguyen H Ngo
(74) *Attorney, Agent, or Firm* — HAUPTMAN HAM, LLP

(57) ABSTRACT

A communication apparatus includes a first duplexer, a second duplexer, and a switch. In a first switch position, a first output end of the switch is connected to a first branch at which the first duplexer is located. In a second switch position, a second output end of the switch is connected to a second branch at which the second duplexer is located. A transmit filter of the first duplexer corresponds to a first uplink band. A receive filter of the first duplexer corresponds to a first downlink band. A bandwidth of the first downlink band is greater than a bandwidth of the first uplink band. A transmit filter of the second duplexer corresponds to a second uplink band. A receive filter of the second duplexer corresponds to a second downlink band. A bandwidth of the second downlink band is greater than a bandwidth of the second uplink band.

9 Claims, 6 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2007/0230414 | A1 | 10/2007 | Afrashteh et al. | |
| 2009/0274073 | A1 | 11/2009 | Sutton | |
| 2013/0051284 | A1 | 2/2013 | Khlat | |
| 2013/0114470 | A1* | 5/2013 | Lee | H04B 1/525 |
| | | | | 370/278 |
| 2015/0229463 | A1* | 8/2015 | Oh | H04B 1/48 |
| | | | | 370/278 |
| 2016/0381687 | A1 | 12/2016 | Yang | |
| 2017/0111080 | A1 | 4/2017 | Hu et al. | |
| 2017/0214428 | A1* | 7/2017 | Zhang | H04L 5/1423 |
| 2018/0248676 | A1* | 8/2018 | Raggio | H04B 7/15542 |

FOREIGN PATENT DOCUMENTS

| | | |
|---|---|---|
| CN | 104685791 A | 6/2015 |
| CN | 108886349 A | 11/2018 |
| CN | 209545887 U | 10/2019 |
| EP | 2509230 A1 | 10/2012 |
| GB | 2457011 A | 8/2009 |
| WO | 2016099449 A1 | 6/2016 |

OTHER PUBLICATIONS

3GPP TS 38.101-1 V16.1.0 (Sep. 2019), 3rd Generation Partnership Project; Technical Specification Group Radio Access Network; NR; User Equipment (UE) radio transmission and reception; Part 1: Range 1 Standalone(Release 16), 280 pages.

International Search Report issued in corresponding International Application No. PCT/CN2019/123583, dated Sep. 9, 2020, pp. 1-9.

Chinese Office Action issued in corresponding Chinese Application No. 201980100376, dated Aug. 15, 2022, pp. 1-9.

Extended European Search Report issued in corresponding European Application No. 19955129.2, dated Oct. 27, 2022, pp. 1-8.

* cited by examiner

COMMUNICATION APPARATUS, TERMINAL DEVICE, AND COMMUNICATION METHOD

CROSS-REFERENCE TO RELATED APPLICATIONS

This application is a continuation of International Application No. PCT/CN2019/123583, filed on Dec. 6, 2019, the disclosure of which is hereby incorporated by reference in its entirety.

TECHNICAL FIELD

Embodiments of this application relate to a communication technology, and in particular, to a communication apparatus, a terminal device, and a communication method.

BACKGROUND

Among different bands (band) in a new radio (new radio, NR) system, a frequency division duplex (frequency division duplexing, FDD) band of 700 MHz supports a symmetrical spectrum of 45 MHz for uplink and downlink, where an uplink (uplink, UL) band is 703-748 MHz and a downlink (downlink, DL) band is 758-803 MHz. It can be learned that a transmit (Tx) spectrum (that is, the UL band) of user equipment (user equipment, UE) is relatively close to a receive (Rx) spectrum (that is, the DL band), with an interval of only 10 MHz (748-758 MHz). It is difficult for a transmit filter and a receive filter in a duplexer to meet a requirement for spectrum suppression of 10 MHz.

In a related technology, UE uses dual duplexers to resolve the foregoing problem. A transmit filter and a receive filter of each duplexer have a bandwidth of 30 MHz, and 30 MHz bandwidths of receive filters in the two duplexers are spliced into a 45 MHz bandwidth, with an overlapping region of 15 MHz in the middle, and 30 MHz bandwidths of transmit filters in the two duplexers are spliced into a 45 MHz bandwidth, with an overlapping region of 15 MHz in the middle.

However, in some scenarios, the foregoing dual duplexers cannot fully use spectrum resources of an operator, a problem of spectrum waste exists, and a peak rate of the UE is limited.

SUMMARY

Embodiments of this application provide a communication apparatus, a terminal device, and a communication method, to improve a utilization of spectrum resources.

According to a first aspect, an embodiment of this application provides a communication apparatus, including a first duplexer, a second duplexer, and a first switch, where a first output end of the first switch is connected to an input end of the first duplexer, and a second output end of the first switch is connected to an input end of the second duplexer; when the first switch is switched to the first output end, a branch at which the first duplexer is located is connected; when the first switch is switched to the second output end, a branch at which the second duplexer is located is connected, where a transmit filter of the first duplexer corresponds to a first uplink band, a receive filter of the first duplexer corresponds to a first downlink band, and a bandwidth of the first downlink band is greater than that of the first uplink band; and a transmit filter of the second duplexer corresponds to a second uplink band, a receive filter of the second duplexer corresponds to a second downlink band, and a bandwidth of the second downlink band is greater than that of the second uplink band.

The communication apparatus is provided with the two duplexers, the transmit filters of the two duplexers are arranged to correspond to two different uplink bands respectively, and the receive filters of the two duplexers are arranged to correspond to two downlink bands respectively. In the same duplexer, the downlink band corresponding to the receive filter is greater than the uplink band corresponding to the transmit filter. Therefore, no matter which branch at which one of the two duplexers is located is connected by the switch, transceiving filtering can be implemented when an uplink bandwidth a downlink bandwidth are asymmetric, such as uplink and downlink asymmetric bandwidths of a 700 MHz band (n28). In this way, when the communication apparatus according to this embodiment of the present invention is applied, the downlink bandwidth is not limited by a size of the uplink bandwidth. In a scenario in which the downlink bandwidth is greater than the uplink bandwidth, spectrum resources of the downlink bandwidth can be fully used, thereby improving a utilization of spectrum resources. In addition, in each of the dual duplexers according to this embodiment of the present invention, a larger downlink band can provide a higher downlink peak rate for user equipment, and a smaller uplink band can ensure that a requirement on protection of an out-of-band spurious index of a digital TV (digital TV, DTV) can be met.

In a possible implementation, the first downlink band and the second downlink band have a same bandwidth.

In a possible implementation, the first uplink band is 703-733 MHz, the second uplink band is 718-748 MHz, and the first downlink band and the second downlink band are 758-803 MHz.

In a possible implementation, the receive filter of the first duplexer and the receive filter of the second duplexer are full-bandwidth filters.

In a possible implementation, the apparatus further includes a power amplifier PA, where an output end of the PA is connected to an input end of the first switch.

In a possible implementation, the apparatus further includes a second switch and an antenna, where an output end of the first duplexer is connected to a first input end of the second switch, and an output end of the second duplexer is connected to a second input end of the second switch; and an output end of the second switch is connected to the antenna.

In the communication apparatus, the PA amplifies power of a signal and then transmits the signal to the first duplexer or the second duplexer, and then the signal is transmitted to the antenna by cooperating with the second switch.

In a possible implementation, the apparatus further includes a first antenna and a second antenna, where an output end of the first duplexer is connected to the first antenna, and an output end of the second duplexer is connected to the second antenna.

In the communication apparatus, the first duplexer and the first antenna are located in a same branch to implement sending and reception of one signal, and the second duplexer and the second antenna are located in a same branch to implement sending and reception of another signal.

According to a second aspect, an embodiment of this application provides a communication method using the communication apparatus according to any one of the first aspect, including: receiving carrier configuration information, where the carrier configuration information includes a bandwidth and/or a frequency of a carrier configured for a terminal device; and when the carrier configuration information corresponds to the first uplink band, switching the first switch to the first output end; or when the carrier configuration information corresponds to the second uplink band, switching the first switch to the second output end.

For the foregoing communication apparatus, based on a carrier and an uplink resource configured by an access network device, the terminal device configures connection states and carrier bandwidths of branches at which two duplexers in the communication apparatus are located, and relevant parameters of uplink and downlink transmission, to ensure uplink and downlink transmission performance when an uplink bandwidth and a downlink bandwidth are asymmetric. In this way, when the communication apparatus according to the first aspect is applied, the downlink bandwidth is not limited by a size of the uplink bandwidth. In a scenario in which the downlink bandwidth is greater than the uplink bandwidth, spectrum resources of the downlink bandwidth can be fully used, thereby improving a utilization of spectrum resources. In addition, based on each of the dual duplexers, a larger downlink band can provide a higher downlink peak rate for user equipment, and a smaller uplink band can ensure that a requirement on protection of an out-of-band spurious index of a DTV can be met.

In a possible implementation, the method further includes: receiving scheduling information, where the scheduling information indicates an uplink resource, and when the first switch is switched to the first output end, a bandwidth of the uplink resource is less than that of the first uplink band, or when the first switch is switched to the second output end, a bandwidth of the uplink resource is less than that of the second uplink band; and sending a signal on the uplink resource.

In a possible implementation, the first downlink band is the same as the second downlink band; the first downlink band includes a plurality of sub-bands, and each of the plurality of sub-bands corresponds to at least one sensitivity index; the bandwidth and/or the frequency of the carrier configured for the terminal device corresponds to one of the plurality of sub-bands; and the method further includes: determining a sensitivity index of the communication apparatus based on at least one sensitivity index corresponding to the one sub-band.

In a possible implementation, the carrier includes an uplink carrier, a bandwidth of the uplink carrier is within a bandwidth of a downlink mapped carrier, and the bandwidth of the downlink mapped carrier is obtained based on the first downlink band or the second downlink band and a default transceiving frequency interval.

According to a third aspect, an embodiment of this application provides a terminal device, including the communication apparatus according to any one of the first aspect.

According to a fourth aspect, a terminal device is provided, including one or more processors, where the one or more processors are configured to execute one or more programs in a memory, so that the terminal device implements the method according to any one of the second aspect.

According to a fifth aspect, a computer readable storage medium is provided, where the computer readable storage medium stores a computer program or instructions, and the computer program or the instructions are used to implement the method according to any one of the second aspect.

DESCRIPTION OF EMBODIMENTS

To make objectives, technical solutions, and advantages of embodiments of this application clearer, the following clearly and completely describes the technical solutions in embodiments of this application with reference to accompanying drawings in embodiments of this application. It is clear that, the described embodiments are merely some rather than all of embodiments of this application. All other embodiments obtained by a person of ordinary skill in the art based on embodiments of this application without creative efforts shall fall within the protection scope of embodiments of this application.

In embodiments, claims, and the accompanying drawings of this specification in this application, the terms "first", "second" and the like are only used for a purpose of distinguishing between descriptions, and cannot be understood as indicating or implying relative importance or indicating or implying a sequence. Moreover, the terms "include", "have", and any other variant thereof are intended to cover a non-exclusive inclusion, for example, including a series of steps or units. Methods, systems, products, or devices are not necessarily limited to those explicitly listed steps or units, but may include other steps or units that are not explicitly listed or that are inherent to such processes, methods, products, or devices.

It should be understood that, in embodiments of this application, "at least one (item)" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one (piece) of the following" or a similar expression thereof indicates any combination of the following, including any combination of one or more of the following. For example, at least one (piece) of a, b, or c may represent: a, b, c, "a and b", "a and c", "b and c", or "a, b, and c", where a, b, and c may be singular or plural.

An embodiment of this application provides a communication system, where the communication system may include an access network device and at least one terminal device. The access network device may establish a wireless connection to each terminal device, and a wireless connec-

Figure 1:
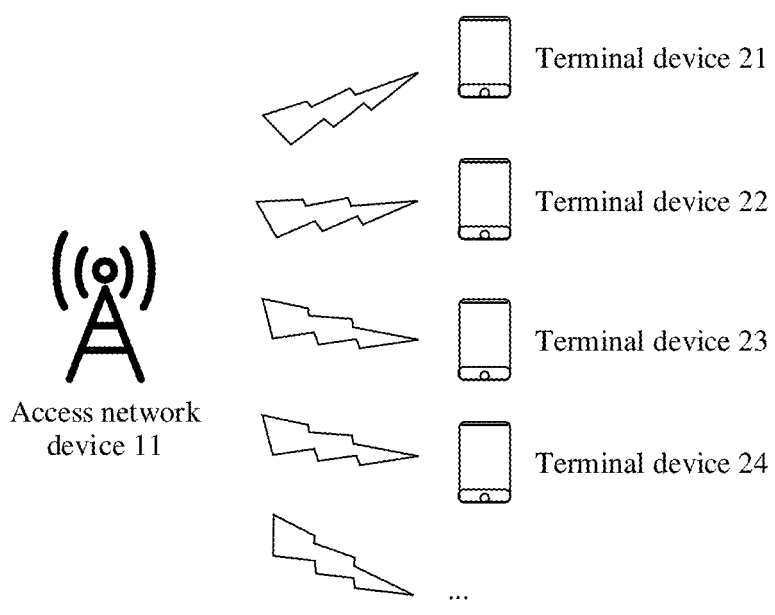
FIG. 1 is a schematic diagram of a communication system according to an embodiment of this application.

5 tion may be established between terminal devices. FIG. 1 is a schematic diagram of a communication system according to an embodiment of this application. As shown in FIG. 1, the access network device is an access network device 11, and the at least one terminal device is a terminal device 21, a terminal device 22, a terminal device 23, and a terminal device 24. A wireless connection may be established between the access network device 11 and the terminal device 21, a wireless connection may be established between the access network device 11 and the terminal device 22, a wireless connection may be established between the terminal device 21 and the terminal device 23, and a wireless connection may be established between the terminal device 21 and the terminal device 24. It should be noted that the access network device and the terminal devices included in the communication system shown in FIG. 1 are only examples, and the connection manner between the access network device and the terminal devices is also only an example. In this embodiment of this application, types and a quantity of network elements included in the communication system and a connection relationship between network elements are not limited thereto.

The communication system may be a communication system that supports a fourth generation (fourth generation, 4G) access technology, for example, a long term evolution (long term evolution, LTE) access technology. Alternatively, the communication system may be a communication system that supports a fifth generation (fifth generation, 5G) access technology, for example, a new radio (new radio, NR) access technology. Alternatively, the communication system may be a communication system that supports a third generation (third generation, 3G) access technology, for example, a universal mobile telecommunications system (universal mobile telecommunications system, UMTS) access technology. Alternatively, the communication system may be a communication system that supports a plurality of wireless technologies, for example, a communication system that supports both the LTE technology and the NR technology. In addition, the communication system may also be applicable to a future-oriented communication technology.

The access network device in this embodiment of this application may be a device on an access network side for supporting the terminal device to access the communication system, and the access network device may be referred to as a base station (base station, BS), for example, may be a base transceiver station (base transceiver station, BTS) and a base station controller (base station controller, BSC) in a 2G access technology communication system, a NodeB (NodeB) and a radio network controller (radio network controller, RNC) in a 3G access technology communication system, an evolved NodeB (evolved NodeB, eNB) in a 4G access technology communication system, a next generation NodeB (next generation NodeB, gNB), a transmission reception point (transmission reception point, TRP), a relay node (relay node), and an access point (access point, AP) in a 5G access technology communication system, and the like.

The terminal device (terminal device) in this embodiment of this application may be a device that provides voice or data connectivity to a user. The terminal device may be referred to as user equipment (user equipment, UE), a mobile station (mobile station), a subscriber unit (subscriber unit), a station (station), terminal equipment (terminal equipment, TE), a terminal, or the like. The terminal device may be a cellular phone (cellular phone), an in-vehicle wireless communication device, a personal digital assistant (personal digital assistant, PDA), a wireless modem (modem), a handheld device (handheld), a laptop computer (laptop computer), a cordless phone (cordless phone), a wireless local loop (wireless local loop, WLL) station, a tablet computer (pad), or the like. With development of wireless communication technologies, any device that can access a wireless communication network, communicate with a wireless network side, or communicate with another object by using a wireless network may be the terminal device in embodiments of this application, for example, a terminal device and a vehicle in intelligent transportation, a household device in a smart household, an electricity meter reading instrument or a voltage monitoring instrument in a smart grid, an environment monitoring instrument, a video surveillance instrument in an intelligent security network, or a cash register. The terminal device may be static and fixed or mobile.

Figure 2:
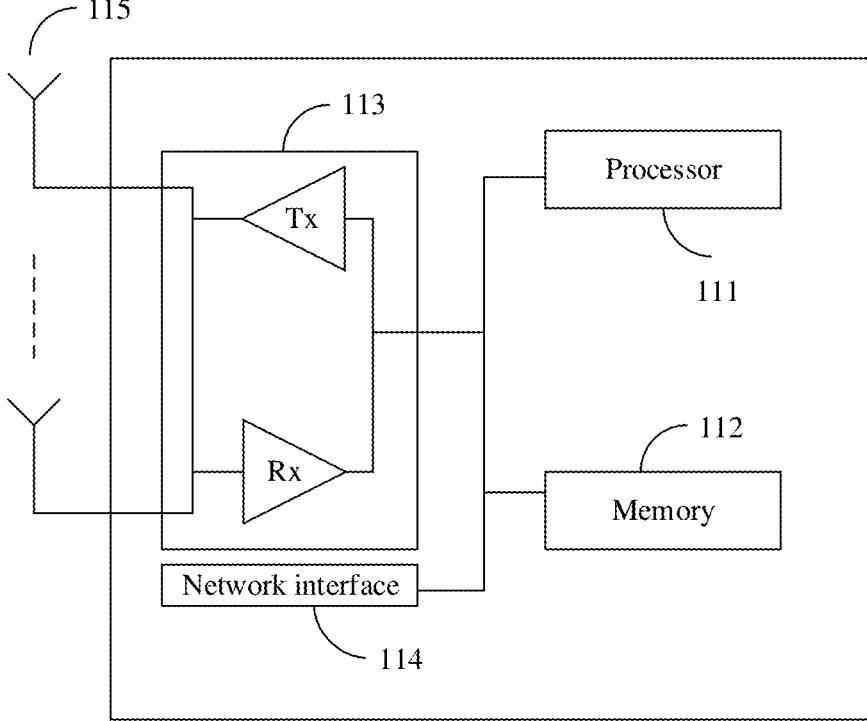
FIG. 2 is a schematic diagram of a structure of an access network device according to an embodiment of this application.

FIG. 2 is a schematic diagram of a structure of an access network device according to an embodiment of this application. Reference may be made to FIG. 2 for the structure of the access network device.

The access network device includes at least one processor 111, at least one memory 112, at least one transceiver 113, at least one network interface 114, and one or more antennas 115. The processor 111, the memory 112, the transceiver 113, and the network interface 114 are connected, for example, through a bus. In this embodiment of this application, the connection may include various interfaces, transmission lines, buses, or the like, and this is not limited in this embodiment. The antenna 115 is connected to the transceiver 113. The network interface 114 is configured to connect the access network device to another communication device by using a communication link. For example, the network interface 114 may include a network interface between the access network device and a core network element, such as an S1 interface, or the network interface 114 may include a network interface between the access network device and another network device (for example, another access network device or a core network element), such as an X2 or Xn interface.

The processor 111 is mainly configured to process a communication protocol and communication data, control the entire access network device, execute a software program, and process data of the software program, for example, to support the access network device to execute an action described in this embodiment. The access network device may include a baseband processor and a central processing unit, where the baseband processor is mainly configured to process a communication protocol and communication data, and the central processing unit is mainly configured to control the entire access network device, execute a software program, and process data of the software program. Functions of the baseband processor and the central processing unit may be integrated into the processor 111 in FIG. 2. A person skilled in the art may understand that the baseband processor and the central processing unit each may be an independent processor, and are interconnected by using a technology such as a bus. A person skilled in the art can understand that the access network device may include a plurality of baseband processors to adapt to different network standards, and the access network device may include a plurality of central processing units to enhance its processing capability, and components of the access network device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the memory in a form of a software program. The processor executes the software program to implement a baseband processing function.

The memory is mainly configured to store the software program and the data. The memory 112 may exist independently and is connected to the processor 111. Optionally, the memory 112 and the processor 111 may be integrated together, for example, integrated in a chip. The memory 112 can store program code that executes the technical solutions in embodiments of this application, and the processor 111 controls execution of the program code. Various types of computer program code that are executed may also be considered as drivers of the processor 111.

FIG. 2 shows only one memory and one processor. In an actual access network device, a plurality of processors and a plurality of memories may exist. The memory may also be referred to as a storage medium, a storage device, or the like. The memory may be a storage element located on a same chip as the processor, namely, an on-chip storage element, or an independent storage element. This is not limited in this embodiment of this application.

The transceiver 113 may be configured to support receiving or sending of a radio frequency signal between the access network device and the terminal device, and the transceiver 113 may be connected to the antenna 115. The transceiver 113 includes a transmitter Tx and a receiver Rx. Specifically, the one or more antennas 115 may receive the radio frequency signal. The receiver Rx of the transceiver 113 is configured to: receive the radio frequency signal from the antenna, convert the radio frequency signal into a digital baseband signal or a digital intermediate frequency signal, and provide the digital baseband signal or the digital intermediate frequency signal for the processor 111, so that the processor 111 further processes the digital baseband signal or the digital intermediate frequency signal, for example, performs demodulation processing and decoding processing. In addition, the transmitter Tx of the transceiver 113 is further configured to: receive a modulated digital baseband signal or digital intermediate frequency signal from the processor 111, convert the modulated digital baseband signal or digital intermediate frequency signal into a radio frequency signal, and send the radio frequency signal through the one or more antennas 115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The transceiver 113 may also be referred to as a transceiver unit, a transceiver, a transceiver apparatus, or the like. Optionally, a component in the transceiver unit for implementing a receiving function may be considered as a receiving unit. A component in the transceiver unit for implementing a sending function may be considered as a sending unit. That is, the transceiver unit includes the receiving unit and the sending unit. The receiving unit may also be referred to as a receiver, an input port, a receiving circuit, or the like.

The sending unit may be referred to as a transmitter, a transmitter, a transmitting circuit, or the like.

Figure 3:
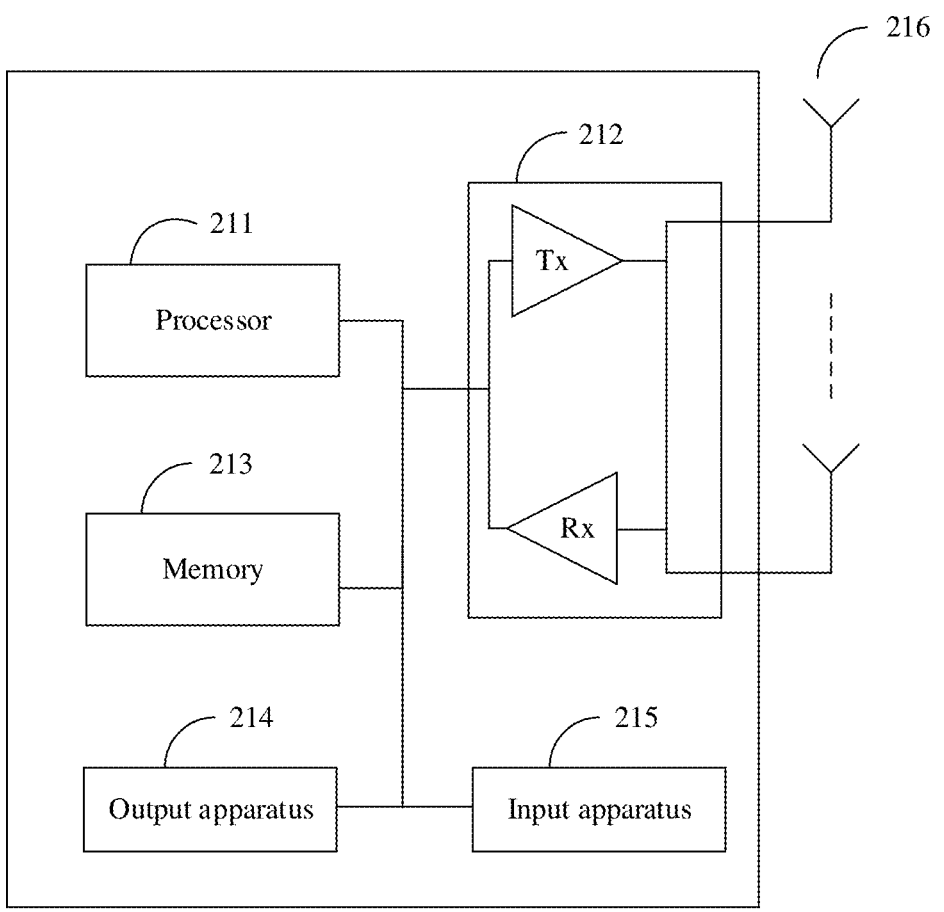
FIG. 3 is a schematic diagram of a structure of a terminal device according to an embodiment of this application.

FIG. 3 is a schematic diagram of a structure of a terminal device according to an embodiment of this application. Reference may be made to FIG. 3 for the structure of the terminal device.

The terminal device includes at least one processor 211, at least one transceiver 212, and at least one memory 213. The processor 211, the memory 213, and the transceiver 212 are connected to each other. Optionally, the terminal device may further include an output apparatus 214, an input apparatus 215, and one or more antennas 216. The antenna 216 is connected to the transceiver 212, and the output apparatus 214 and the input apparatus 215 are connected to the processor 211.

The transceiver 212, the memory 213, and the antenna 216 may implement similar functions with reference to the related description in FIG. 2.

The processor 211 may be a baseband processor or a CPU. The baseband processor and the CPU may be integrated or separated.

The processor 211 may be configured to implement various functions for the terminal device. For example, the processor is configured to process a communication protocol and communication data; or is configured to control the entire terminal device, execute a software program, and process data of the software program; or is configured to assist in completing a computing processing task, for example, graphics, image, or audio processing. Alternatively, the processor 211 is configured to implement one or more of the foregoing functions.

The output apparatus 214 communicates with the processor 211 to display information in a plurality of manners. For example, the output apparatus 214 may be a liquid crystal display (liquid crystal display, LCD), a light emitting diode (light emitting diode, LED) display device, a cathode ray tube (cathode ray tube, CRT) display device, a projector (projector), or the like. The input apparatus 215 communicates with the processor 211 to receive user input in a plurality of manners. For example, the input apparatus 215 may be a mouse, a keyboard, a touchscreen, a sensor, or the like.

A receive filter and a transmit filter of each of dual duplexers in a related technology each have a bandwidth of 30 MHz. However, a maximum downlink bandwidth that can be allocated in spectrum allocation of China broadcasting network (China broadcasting network, CBN) is 40 MHz. To provide a highest downlink peak rate for user equipment as far as possible, a bandwidth of a downlink band can be configured as large as possible. However, the dual duplexers used in the related technology can only support symmetrical uplink and downlink bandwidths up to 30 MHz, and a bandwidth configuration of an uplink band is consistent with that of a downlink band. Because an uplink signal sent by user equipment mainly includes signaling and a small amount of data, the sending usually can be completed without a large bandwidth. If an uplink bandwidth and a downlink bandwidth with a same bandwidth size are allocated, a waste of uplink spectrum resources may be caused, or a downlink spectrum is limited by the duplexer to allocate only a 30 MHz bandwidth at most at a time, and some downlink spectrum resources cannot be allocated, thereby reducing a utilization of spectrum resources. In addition, when an uplink bandwidth and a downlink bandwidth with a same bandwidth size are allocated and the bandwidth is relatively large, it is difficult to meet a requirement on protection of an out-of-band spurious index of a DTV.

In this embodiment of this application, it is proposed to consider asymmetric uplink and downlink bandwidths in spectrum allocation, and an uplink spectrum and a downlink spectrum are decoupled, for example, the bandwidth of the uplink band is allocated 30 MHz, and the bandwidth of the downlink band is allocated 40 MHz. Based on this allocation solution, an embodiment of this application provides a communication apparatus, which is used to support transceiving filtering when the uplink bandwidth and the downlink bandwidth are asymmetric.

Figure 4:
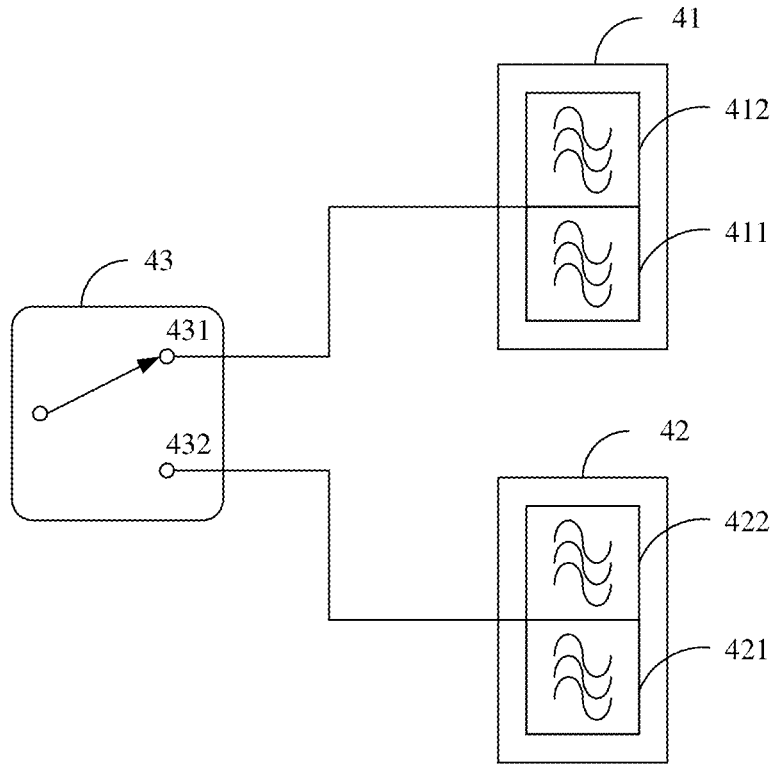
FIG. 4 is a schematic diagram of a structure of a communication apparatus according to Embodiment 1 of this application.

An embodiment of this application provides a communication apparatus, and the communication apparatus may be applied to the transceiver 212 of the foregoing terminal device. FIG. 4 is a schematic diagram of a structure of a communication apparatus according to Embodiment 1 of this application. As shown in FIG. 4, the communication apparatus may include: a first duplexer 41, a second duplexer 42, and a first switch 43. A first output end 431 of the first switch 43 is connected to an input end of the first duplexer 41, and a second output end 432 of the first switch 43 is connected to an input end of the second duplexer 42. When the first switch 43 is switched to the first output end 431, a branch at which the first duplexer 41 is located is connected. When the first switch 43 is switched to the second output end 432, a branch at which the second duplexer 42 is located is connected. A transmit filter 411 of the first duplexer 41 corresponds to a first uplink band, a receive filter 412 of the first duplexer 41 corresponds to a first downlink band, and a bandwidth of the first downlink band is greater than that of the first uplink band. A transmit filter 421 of the second duplexer 42 corresponds to a second uplink band, a receive filter 422 of the second duplexer 42 corresponds to a second downlink band, and a bandwidth of the second downlink band is greater than that of the second uplink band.

Optionally, the first downlink band and the second downlink band have a same bandwidth. That the first downlink band and the second downlink band have a same bandwidth may be understood as that the first downlink band and the second downlink band have the same bandwidth, but frequency positions of the two bands are different. For example, the first downlink band is 758-803 MHz, and the second downlink band is 703-748 MHz. The two bands each have a bandwidth of 45 MHz, but the second downlink band is located in a low-frequency position, while the first downlink band is located in a high-frequency position. That the first downlink band and the second downlink band have a same bandwidth may alternatively be understood as that the first downlink band and the second downlink band have the same bandwidth and position. For example, the first downlink band and the second downlink band are 758-803 MHz and have a bandwidth of 45 MHz.

Preferably, the first uplink band may be 703-733 MHz with a bandwidth of 30 MHz, the second uplink band may be 718-748 MHz with a bandwidth of 30 MHz, and the first downlink band and the second downlink band may be 758-803 MHz with a bandwidth of 45 MHz.

In a possible implementation, the receive filter 412 of the first duplexer 41 and the receive filter 422 of the second duplexer 42 are full-bandwidth filters. The full bandwidth may be understood as the entire downlink bandwidth that matches a communication standard supported by a communication system.

The communication apparatus is provided with the two duplexers, the transmit filters of the two duplexers are arranged to correspond to two different uplink bands respectively, and the receive filters of the two duplexers are arranged to correspond to two downlink bands respectively. In the same duplexer, the downlink band corresponding to the receive filter is greater than the uplink band corresponding to the transmit filter. Therefore, no matter which branch at which one of the two duplexers is located is connected by the switch, transceiving filtering can be implemented when an uplink bandwidth a downlink bandwidth are asymmetric, such as uplink and downlink asymmetric bandwidths of a 700 MHz band (n28). In this way, when the communication apparatus according to this embodiment of the present invention is applied, the downlink bandwidth is not limited by a size of the uplink bandwidth. In a scenario in which the downlink bandwidth is greater than the uplink bandwidth, spectrum resources of the downlink bandwidth can be fully used, thereby improving a utilization of spectrum resources. In addition, in each of the dual duplexers according to this embodiment of the present invention, a larger downlink band can provide a higher downlink peak rate for user equipment, and a smaller uplink band can ensure that a requirement on protection of an out-of-band spurious index of a digital TV DTV can be met.

Figure 5:
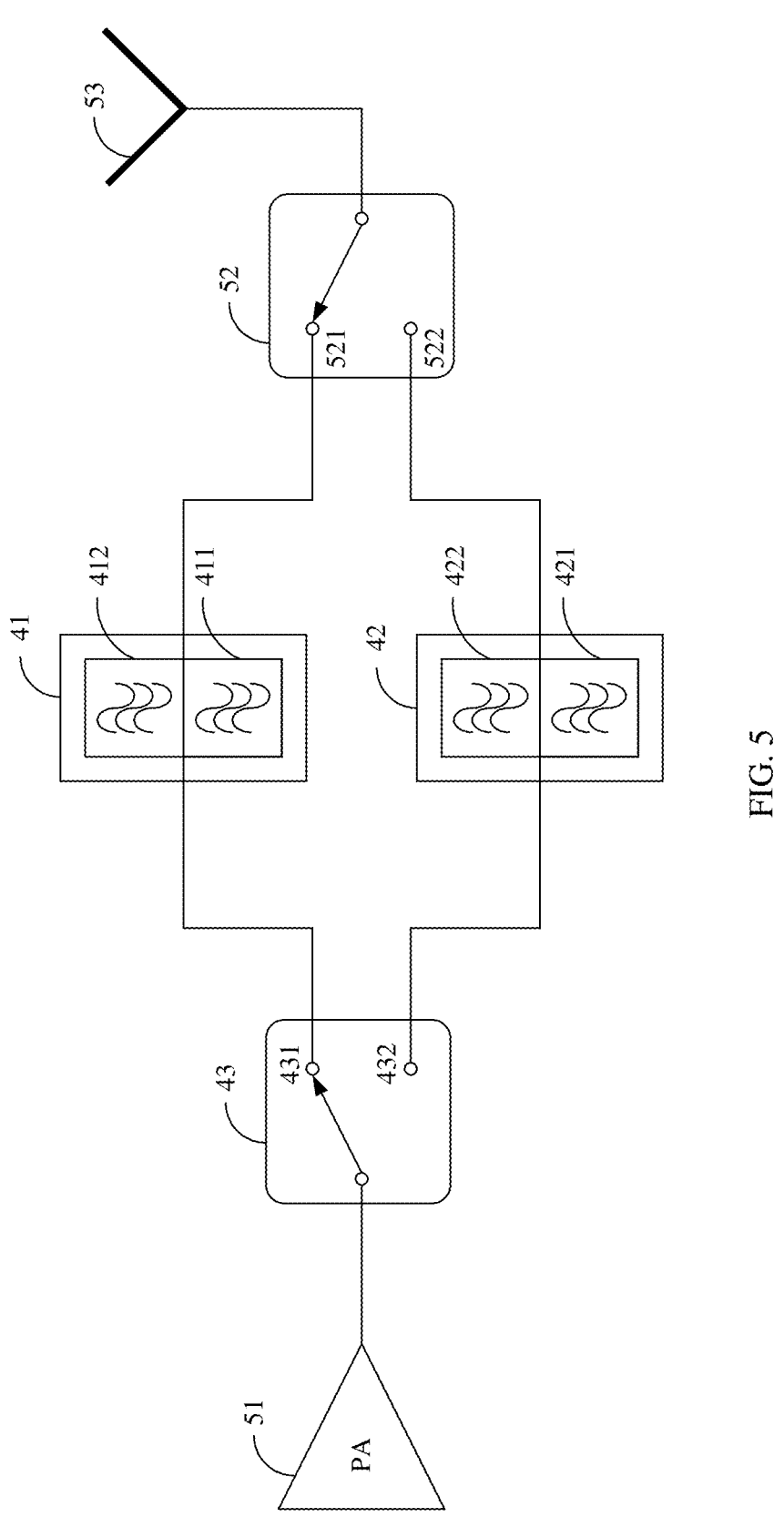
FIG. 5 is a schematic diagram of a structure of a communication apparatus according to Embodiment 2 of this application.

Based on the communication apparatus shown in FIG. 4, FIG. 5 is a schematic diagram of a structure of a communication apparatus according to Embodiment 2 of this application. As shown in FIG. 5, the communication apparatus may further include: a power amplifier (power amplifier, PA) 51, a second switch 52, and an antenna 53. An output end of the PA 51 is connected to an input end of the first switch 43. An output end of the first duplexer 41 is connected to a first input end 521 of the second switch 52, and an output end of the second duplexer 42 is connected to a second input end 522 of the second switch 52. An output end of the second switch 52 is connected to the antenna 53.

In the communication apparatus, the PA 51 amplifies power of a signal and then transmits the signal to the first duplexer 41 or the second duplexer 42, and then the signal is transmitted to the antenna 53 by cooperating with the second switch 52. When the first switch 43 is switched to the first output end 431 and the second switch 52 is switched to the first input end 521, the branch at which the first duplexer 41 is located is connected, or when the first switch 43 is switched to the second output end 432 and the second switch 52 is switched to the second input end 522, the branch at which the second duplexer 42 is located is connected.

Figure 6:
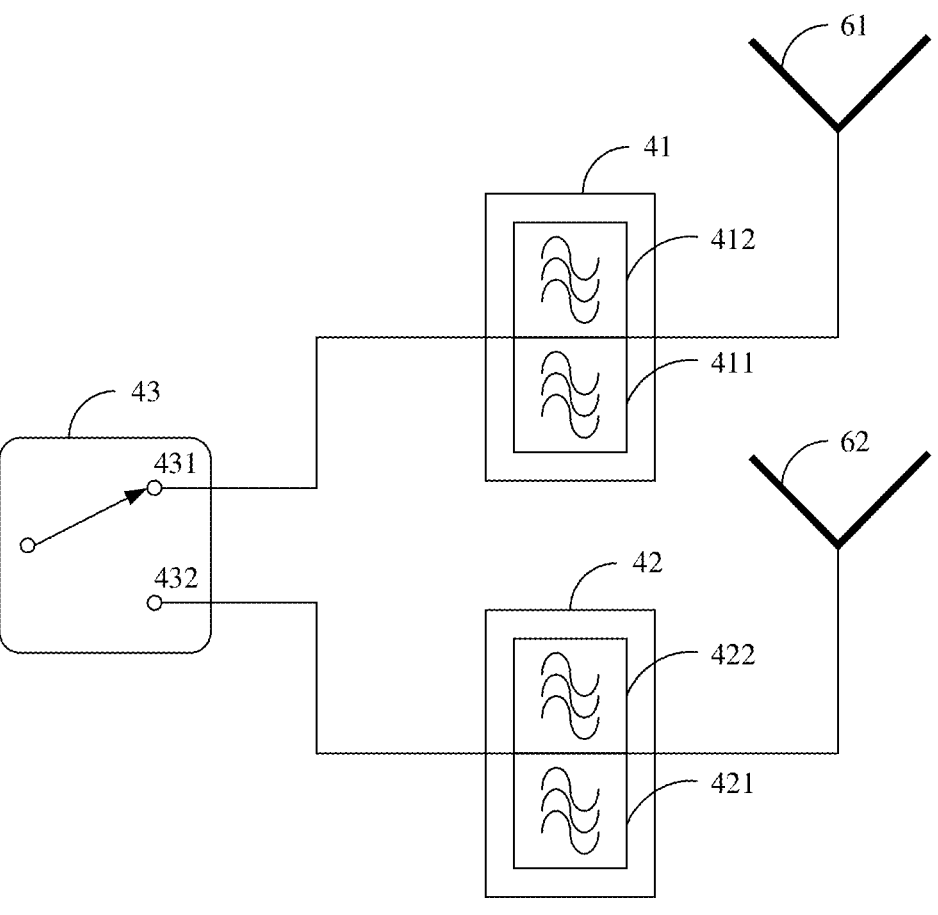
FIG. 6 is a schematic diagram of a structure of a communication apparatus according to Embodiment 3 of this application.

Based on the communication apparatus shown in FIG. 4, FIG. 6 is a schematic diagram of a structure of a communication apparatus according to Embodiment 3 of this application. As shown in FIG. 6, the communication apparatus may further include: a first antenna 61 and a second antenna 62. An output end of the first duplexer 41 is connected to the first antenna 61, and an output end of the second duplexer 42 is connected to the second antenna 62.

In the communication apparatus, the first duplexer 41 and the first antenna 61 are located in a same branch to implement sending and reception of one signal, and the second duplexer 42 and the second antenna 62 are located in a same branch to implement sending and reception of another signal.

Figure 7:
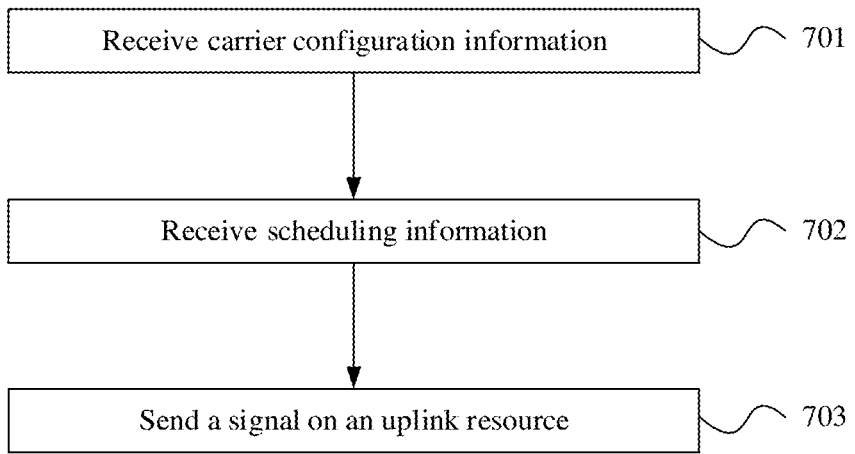
FIG. 7 is a flowchart of a communication method according to an embodiment of this application.

An embodiment of this application provides a communication method using the communication apparatus according to any one of the foregoing apparatus embodiments, where the communication method may be performed by a terminal device including the foregoing communication apparatus. FIG. 7 is a flowchart of a communication method according to an embodiment of this application. As shown in FIG. 7, the communication method in this embodiment may include:

Step 701: Receive Carrier Configuration Information.

The carrier configuration information includes a bandwidth and/or a frequency of a carrier configured for a terminal device; and when the carrier configuration information corresponds to a first uplink band, a first switch in the communication apparatus is switched to a first output end; or when the carrier configuration information corresponds to a second uplink band, a first switch in the communication apparatus is switched to a second output end.

An access network device configures the carrier for the terminal device, and then sends the carrier configuration information to the terminal device by using a downlink signal. As described above, receive filters in two duplexers in the communication apparatus correspond to a first downlink band and a second downlink band respectively, and the first downlink band and the second downlink band may have the same bandwidth and different positions, or may have the same bandwidth and position, or both have a full bandwidth. A downlink band corresponding to the receive filter is greater than an uplink band corresponding to a transmit filter in the same duplexer. Therefore, when determining a state of the first switch, the terminal device focuses on configuration information of an uplink carrier in the carrier configuration information.

In a possible implementation, when the carrier configuration information received by the terminal device is the bandwidth of the carrier, the terminal device focuses on which of the two duplexers has a transmit filter that supports a band which the bandwidth of the uplink carrier belongs to. For example, the bandwidth of the uplink carrier is 703-733 MHz. In this case, the bandwidth of the uplink carrier corresponds to the first uplink band, and the terminal device switches the first switch in the communication apparatus to the first output end. The bandwidth of the uplink carrier is 718-748 MHz. In this case, the bandwidth of the uplink carrier corresponds to the second uplink band, and the terminal device switches the first switch in the communication apparatus to the second output end.

In a possible implementation, when the carrier configuration information received by the terminal device is the frequency of the carrier, the terminal device focuses on which of the two duplexers has a transmit filter that supports a band which the frequency of the uplink carrier belongs to. For example, the frequency of the uplink carrier is 718 MHz. In this case, the frequency of the uplink carrier corresponds to the first uplink band, and the terminal device switches the first switch in the communication apparatus to the first output end. The frequency of the uplink carrier is 733 MHz. In this case, the frequency of the uplink carrier corresponds to the second uplink band, and the terminal device switches the first switch in the communication apparatus to the second output end.

In a possible implementation, when the carrier configuration information received by the terminal device is the bandwidth and the frequency of the carrier, the terminal device focuses on which of the two duplexers has a transmit filter that supports a band which the bandwidth and the frequency of the uplink carrier belong to. Reference may be made to the foregoing description. Details are not described again herein.

Preferably, when the terminal device configures the bands of the transmit filter and the receive filter in the duplexer, an uplink carrier of the uplink band corresponding to the transmit filter and a downlink carrier of the downlink band corresponding to the receive filter need to follow a constraint relationship. That is, a bandwidth of the uplink carrier is within a bandwidth of a downlink mapped carrier, and the bandwidth of the downlink mapped carrier is obtained based on the first downlink band or the second downlink band and a default transceiving frequency interval.

Figures 8, 9:
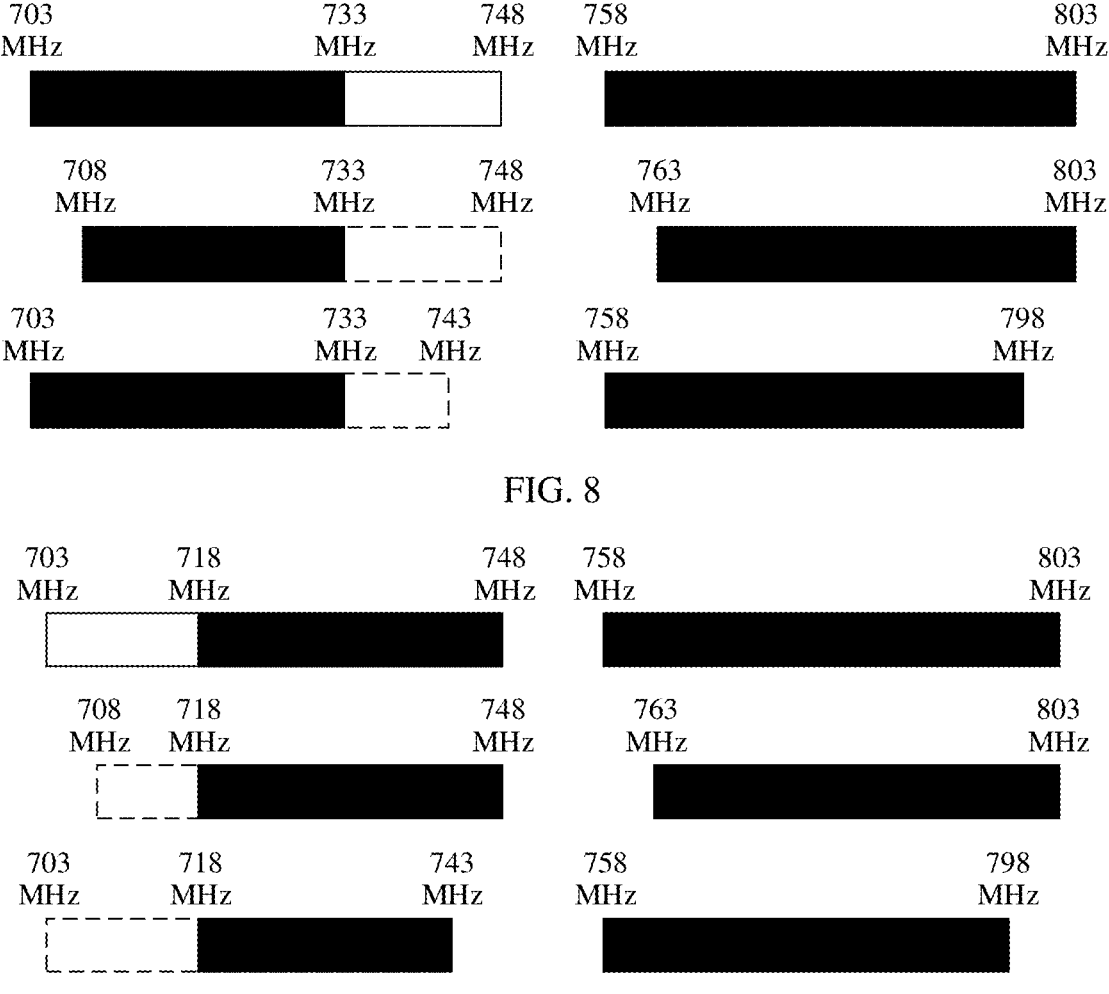
FIG. 8 shows an example of a schematic diagram of a carrier configuration.
FIG. 9 shows an example of a schematic diagram of another carrier configuration.

FIG. 8 shows an example of a schematic diagram of a carrier configuration. As shown in FIG. 8, assuming that the terminal device switches the first switch in the communication apparatus to the first output end, in this case, a maximum bandwidth of the uplink carrier that can be supported by the terminal device is 703-733 MHz, and a maximum bandwidth of the downlink carrier is 758-803 MHz.

When the bandwidth of the configured downlink carrier is 763-803 MHz (40 MHz in total), the bandwidth of the downlink mapped carrier is 708-748 MHz. Because the bandwidth of the uplink carrier needs to be within the bandwidth of the downlink mapped carrier, the terminal device configures the bandwidth of the uplink carrier to be 708-733 MHz (25 MHz in total).

When the bandwidth of the configured downlink carrier is 758-798 MHz (40 MHz in total), the bandwidth of the downlink mapped carrier is 703-743 MHz. Because the bandwidth of the uplink carrier needs to be within the bandwidth of the downlink mapped carrier, the terminal device configures the bandwidth of the uplink carrier to be 703-733 MHz (30 MHz in total).

FIG. 9 shows an example of a schematic diagram of another carrier configuration. As shown in FIG. 9, assuming that the terminal device switches the first switch in the communication apparatus to the second output end, in this case, a maximum bandwidth of the uplink carrier that can be supported by the terminal device is 718-748 MHz, and a maximum bandwidth of the downlink carrier is 758-803 MHz.

When the bandwidth of the configured downlink carrier is 763-803 MHz (40 MHz in total), the bandwidth of the downlink mapped carrier 708-748 MHz. Because the bandwidth of the uplink carrier needs to be within the bandwidth of the downlink mapped carrier, the terminal device configures the bandwidth of the uplink carrier to be 718-748 MHz (30 MHz in total).

When the bandwidth of the configured downlink carrier is 758-798 MHz (40 MHz in total), the bandwidth of the downlink mapped carrier 703-743 MHz. Because the bandwidth of the uplink carrier needs to be within the bandwidth of the downlink mapped carrier, the terminal device configures the bandwidth of the uplink carrier to be 718-743 MHz (25 MHz in total).

Step 702: Receive Scheduling Information.

The scheduling information indicates an uplink resource, and when the first switch in the communication apparatus is switched to the first output end, a bandwidth of the uplink resource is less than that of the first uplink band, or when the first switch in the communication apparatus is switched to the second output end, a bandwidth of the uplink resource is less than that of the second uplink band. A maximum bandwidth of the uplink resource allocated by the access network device to the terminal device cannot be greater than a bandwidth of an uplink band corresponding to a transmit filter of a duplexer when a branch at which the duplexer is located is connected. To be specific, when a branch at which a first duplexer is located is connected, the bandwidth of the uplink resource is less than that of the first uplink band, or when a branch at which a second duplexer is located is connected, the bandwidth of the uplink resource is less than that of the second uplink band.

The terminal device can ensure uplink and downlink transmission performance by using the following two methods.

I. Uplink Transmission Performance is Ensured Preferably.

A first downlink band and a second downlink band have a same bandwidth. That a first downlink band and a second downlink band have a same bandwidth may be understood as that the first downlink band and the second downlink band have a same bandwidth and position. For example, the first downlink band and the second downlink band are 758-803 MHz. The first downlink band includes a plurality of sub-bands, and each of the plurality of sub-bands corresponds to at least one sensitivity index. The bandwidth and/or the frequency of the carrier configured by the access network device for the terminal device corresponds to one of the plurality of sub-bands. In this case, the terminal device determines a sensitivity index of the communication appa-ratus based on the at least one sensitivity index correspond-ing to the sub-band. Preferably, the bandwidth of the con-figured downlink carrier may be divided into a plurality of sub-bands, each of the sub-bands defines at least one sen-sitivity index, and the terminal device relaxes to some extent sensitivity indexes of those of the plurality of sub-bands close to the uplink carrier.

II. Downlink Transmission Performance is Ensured Prefer-ably.

(1) The terminal device may limit a quantity of resource blocks (resource block, RB) for sending uplink data. If the terminal device may use up to 50 RBs to send uplink data, due to the limitation on the quantity of RBs, even if the terminal device is allocated 50 RBs, the quantity of RBs still needs to be reduced when uplink data is actually sent, for example, only up to 45 RBs can be used to send uplink data. Preferably, only when the terminal device switches the first switch to the second output end, the terminal device needs to limit the quantity of RBs for sending uplink data. The quantity of RBs is an example description, and the quantity of RBs and the reduction of the quantity of RBs are not limited in this embodiment of this application.

(2) The terminal device may limit maximum transmit power for sending uplink data. If the maximum transmit power of the terminal device may be 23 dB, considering interference and protection of adjacent bands, the terminal device can only perform sending at 20 dB. Preferably, only when the terminal device switches the first switch to the second output end, the terminal device needs to limit the maximum transmit power for sending uplink data. The transmit power is an example description, and the transmit power and a quantity of back-offs of the transmit power are not limited in this embodiment of this application.

Step 703: Send a Signal on the Uplink Resource.

In this embodiment, for the foregoing communication apparatus, based on the carrier and the uplink resource configured by the access network device, the terminal device configures connection states and carrier bandwidths of branches at which the two duplexers in the communication apparatus are located, and relevant parameters of uplink and downlink transmission, to ensure uplink and downlink trans-mission performance when the uplink bandwidth and the downlink bandwidth are asymmetric. In this way, when the communication apparatus shown in any one of FIG. 4 to FIG. 6 is applied, the downlink bandwidth is not limited by a size of the uplink bandwidth. In a scenario in which the downlink bandwidth is greater than the uplink bandwidth, spectrum resources of the downlink bandwidth can be fully used, thereby improving a utilization of spectrum resources. In addition, based on each of the dual duplexers, a larger downlink band can provide a higher downlink peak rate for user equipment, and a smaller uplink band can ensure that a requirement on protection of an out-of-band spurious index of a DTV can be met.

In an implementation process, steps of the foregoing method embodiments may be implemented by using an integrated logic circuit of hardware in the processor or by using instructions in a form of software. The processor may be a general-purpose processor, a digital signal processor (digital signal processor, DSP), an application-specific inte-grated circuit (application-specific integrated circuit, ASIC), a field programmable gate array (field programmable gate array, FPGA) or another programmable logic component, a discrete gate or a transistor logic device, or a discrete hardware component. The general-purpose processor may be a microprocessor, or the processor may be any conven-tional processor or the like. The steps of the methods disclosed in embodiments of this application may be directly completed by using a hardware encoding processor, or may be completed by using a combination of hardware and software modules in an encoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

The memory in the foregoing embodiments may be a volatile memory or a nonvolatile memory, or may include both the volatile memory and the nonvolatile memory. The nonvolatile memory may be a read-only memory (read-only memory, ROM), a programmable read-only memory (pro-grammable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external buffer. Through example but not limitative descriptions, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic ran-dom access memory (synchlink DRAM, SLDRAM), and a direct rambus random access memory (direct rambus RAM, DR RAM). It should be noted that the memories in the systems and method described in this specification include but are not limited to these memories and any memory of another suitable type.

A person of ordinary skill in the art may be aware that, in combination with the units and algorithm steps in the examples described in embodiments disclosed in this speci-fication, this application can be implemented by electronic hardware or a combination of computer software and elec-tronic hardware. Whether the functions are performed by hardware or software depends on particular applications and design constraints of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, reference may be made to a corresponding process in the foregoing method embodiment. Details are not described herein again.

In the several embodiments provided in embodiments of this application, it should be understood that the disclosed system, apparatus and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of embodiments of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
processing, by a processor, carrier configuration information, wherein the carrier configuration information comprises at least one of a bandwidth or a frequency of a carrier configured for a terminal device;
causing a switch to be in a first switch position in response to a determination that the carrier configuration information corresponds to a first uplink band, wherein in the first switch position the switch causes a first branch at which a first duplexer is located to be connected to a first output end of the switch;
causing the switch to be in a second switch position in response to a determination that the carrier configuration information corresponds to a second uplink band, wherein in the second switch position the switch causes a second branch at which a second duplexer is located to be connected to a second output end of the switch;
receiving scheduling information, wherein the scheduling information indicates an uplink resource, the switch is caused to be in the first switch position in response to a first bandwidth of the uplink resource being less than a second bandwidth of the first uplink band, and the switch is caused to be in the second switch position in response to a third bandwidth of the uplink resource being less than a fourth bandwidth of the second uplink band; and
sending a signal on the uplink resource.

2. The method according to claim 1, wherein
a first downlink band is the same as a second downlink band,
the first downlink band comprises a plurality of sub-bands,
each of the plurality of sub-bands corresponds to at least one sensitivity index,
at least one of the bandwidth or the frequency of the carrier configured for the terminal device corresponds to one of the plurality of sub-bands, and
the method further comprises:
determining a sensitivity index of the terminal device based on the at least one sensitivity index corresponding to the one sub-band corresponding to the carrier configured for the terminal device.

3. The method according to claim 1, wherein
the carrier comprises an uplink carrier,
a first bandwidth of the uplink carrier is within a second bandwidth of a downlink mapped carrier, and
the second bandwidth of the downlink mapped carrier is determined based on a first downlink band or on a second downlink band and a default transceiving frequency interval.

4. A non-transitory computer-readable storage medium, comprising executable instructions, wherein the executable instructions, when executed by a computer, cause the computer to:
process carrier configuration information, wherein the carrier configuration information comprises at least one of a bandwidth or a frequency of a carrier configured for a terminal device;
cause a switch to be in a first switch position in response to a determination that the carrier configuration information corresponds to a first uplink band, wherein in the first switch position the switch causes a first branch at which a first duplexer is located to be connected to a first output end of the switch;
cause the switch to be in a second switch position in response to a determination that the carrier configuration information corresponds to a second uplink band, wherein in the second switch position the switch causes a second branch at which a second duplexer is located to be connected to a second output end of the switch;
receive scheduling information, wherein the scheduling information indicates an uplink resource, the switch is caused to be in the first switch position in response to a first bandwidth of the uplink resource being less than a second bandwidth of the first uplink band, and the switch is caused to be in the second switch position in response to a third bandwidth of the uplink resource being less than a fourth bandwidth of the second uplink band; and send a signal on the uplink resource.

5. The non-transitory computer-readable storage medium according to claim 4, wherein a first downlink band is the same as a second downlink band, the first downlink band comprises a plurality of sub-bands, each of the plurality of sub-bands corresponds to at least one sensitivity index, at least one of the bandwidth or the frequency of the carrier configured for the terminal device corresponds to one of the plurality of sub-bands, and the executable instructions, when executed by the computer, further cause the computer to:

determine a sensitivity index of the terminal device based on the at least one sensitivity index corresponding to the one sub-band corresponding to the carrier configured for the terminal device.

6. The non-transitory computer-readable storage medium according to claim 4, wherein the carrier comprises an uplink carrier, a first bandwidth of the uplink carrier is within a second bandwidth of a downlink mapped carrier, and the second bandwidth of the downlink mapped carrier is determined based on a first downlink band or on a second downlink band and a default transceiving frequency interval.

7. An apparatus, comprising:

a processor; and a memory having instructions stored thereon that, when executed by the processor, cause the apparatus to:

process carrier configuration information, wherein the carrier configuration information comprises at least one of a bandwidth or a frequency of a carrier configured for a terminal device;

cause a switch to be in a first switch position in response to a determination that the carrier configuration information corresponds to a first uplink band, wherein in the first switch position the switch causes a first branch at which a first duplexer is located to be connected to a first output end of the switch;

cause the switch to be in a second switch position in response to a determination that the carrier configuration information corresponds to a second uplink band, wherein in the second switch position the switch causes a second branch at which a second duplexer is located to be connected to a second output end of the switch;

receive scheduling information, wherein the scheduling information indicates an uplink resource, the switch is caused to be in the first switch position in response to a first bandwidth of the uplink resource being less than a second bandwidth of the first uplink band, and the switch is caused to be in the second switch position in response to a third bandwidth of the uplink resource being less than a fourth bandwidth of the second uplink band; and send a signal on the uplink resource.

8. The apparatus according to claim 7, wherein a first downlink band is the same as a second downlink band, the first downlink band comprises a plurality of sub-bands, each of the plurality of sub-bands corresponds to at least one sensitivity index, at least one of the bandwidth or the frequency of the carrier configured for the terminal device corresponds to one of the plurality of sub-bands, and the apparatus is further caused to:

determine a sensitivity index of the terminal device based on the at least one sensitivity index corresponding to the one sub-band corresponding to the carrier configured for the terminal device.

9. The apparatus according to claim 7, wherein the carrier comprises an uplink carrier, a first bandwidth of the uplink carrier is within a second bandwidth of a downlink mapped carrier, and the second bandwidth of the downlink mapped carrier is determined based on a first downlink band or on a second downlink band and a default transceiving frequency interval.

* * * * *